(12) United States Patent
Dumas

(10) Patent No.: US 6,778,647 B1
(45) Date of Patent: Aug. 17, 2004

(54) REDUNDANT DATABASE STORAGE OF SELECTED RECORD INFORMATION FOR AN AUTOMATED INTERROGATION DEVICE

(75) Inventor: Gregory P. Dumas, Milpitas, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/415,555

(22) Filed: Oct. 8, 1999

Related U.S. Application Data

(60) Provisional application No. 60/108,430, filed on Nov. 13, 1998.

(51) Int. Cl.[7] .................................... H04M 11/00
(52) U.S. Cl. ....................... 379/93.12; 379/265.02; 379/221.11; 379/201
(58) Field of Search .................. 379/93.12, 93.25, 379/221.11, 88.25, 88.27, 265.02, 266.09; 705/6, 5, 26

(56) References Cited

U.S. PATENT DOCUMENTS

| | | | | |
|---|---|---|---|---|
| 5,345,501 A | * | 9/1994 | Shelton ...................... | 379/88.2 |
| 5,675,637 A | * | 10/1997 | Szlam et al. ............ | 379/142.17 |
| 5,740,231 A | * | 4/1998 | Cohn et al. .................. | 370/401 |
| 6,304,881 B1 | * | 10/2001 | Halim et al. ................ | 707/201 |
| 6,356,874 B1 | * | 3/2002 | Ohrn ............................. | 705/6 |
| 2002/0057770 A1 | * | 5/2002 | Clabaugh et al. ........ | 379/88.16 |

* cited by examiner

Primary Examiner—Fan Tsang
Assistant Examiner—Olisa Anwah

(57) ABSTRACT

A system for automated handling of call interactions includes an automated interrogation device, typically having interactive voice response (IVR) capability, with local memory for storing subset records. Each subset record corresponds to a master record that is remotely stored. The subset record contains sufficient information to allow a calling party to complete an identification process and to at least initiate an intended operation. For example, in a banking environment, the locally stored information may include customer names, account identifications, account balances, dates, and other information that is commonly requested by bank customers. In response to an incoming call, IVR queries are directed to the calling party and the appropriate subset record is accessed. Preferably, the subset record is retrieved to temporary storage, such as random access memory. Thus, there are temporarily three storages of record material specific to the calling party. Information within the subset record is readily accessible without an on-line connection to the remote storage of the corresponding master record. However, data exchanges are frequently implemented in order to match information in the subset records with information in the master records.

19 Claims, 3 Drawing Sheets

REDUNDANT DATABASE STORAGE OF SELECTED RECORD INFORMATION FOR AN AUTOMATED INTERROGATION DEVICE

This application claims the benefit of U.S. Provisional Application No. 60/108,430, filed Nov. 13, 1998.

TECHNICAL FIELD

The invention relates generally to systems that include an automated interrogation device and more particularly to storing information in a database format for use with interactive voice recognition equipment and like.

DESCRIPTION OF THE RELATED ART

There are a number of alternatives for implementing a call-handling facility to transact business. The business transaction may be informational, such as providing product support for items sold by the business which operates the call-handling facility, or may be directed to product marketing. In an automatic call distribution (ACD) implementation, agents are employed to handle incoming and/or outgoing calls. The advantage of an ACD system is that each call is handled by a human. However, in some applications ACD agents must receive significant training in order to ensure competent handling of issues raised by callers. This is particularly true in a product support environment. Another concern is that the operation of an ACD system is expensive.

Automated interrogation devices may be used to at least reduce the number of calls that require handling by a person. The most common automated interrogation device is an interactive voice response (IVR) unit. An IVR may be configured to present menus of options that are traversed in a listen-respond manner. A first listen-respond message may be presented to a caller with a greeting that solicits a response from the caller. The response is detected by the unit and used as a prompt for presenting the next option. Thus, a call processing tree is formed by properly organizing the messages. A first series of messages may be used to verify identification of a caller, such as by requiring input of a personal identification number (PIN) using dual tone multifrequency (DTMF) signals generated by depressing keys at the telephone of the caller. Another sequence may be used to identify the caller's purpose. For example, in a banking environment, the caller may be instructed to depress a designated key if the interest is in obtaining a present account balance, but to depress a different key if the interest is in obtaining information regarding a particular transaction. In a sales environment, the sequence may be related to identifying a product, its price, and the inventory status of the product prior to placing an order.

A call-handling facility having IVR functionality may use a high capacity programmable platform that is flexible, scalable and upgradable. Using this platform, all of the necessary information is maintained at the call-handling facility. Typically, the information is stored in a database format. Depending upon the type of business that is to be transacted, the information distinguishes users of the facility (e.g., by using PINs), provides accounting, distinguishes products, and identifies product availability. Thus, the call-handling facility is self-contained with respect to completion of the business transaction. The concerns are that the high capacity platform is expensive and may be difficult to maintain in some applications.

At a lower end, the IVR functionality may be achieved using a low capacity programmable platform. In many applications, this requires storage of the necessary information at a remote site. Thus, the IVR unit is at the call-handling facility, but a remote host is used as an external database. The host is not solely dedicated to providing support for the single IVR unit. The use of the host reduces hardware costs. However, this requires a real-time data link between the IVR unit and the host in order to complete a transaction.

U.S. Pat. No. 5,345,501 to Shelton describes a telephone central office having a voice response unit and an adjunct computer. Consequently, there are separate data storage capacities for voice messages and vendor information. The vendor information is in a database format of customer identifications and inventory availabilities for a number of vendors. Each vendor maintains a host computer, but the various inventories are uploaded to the adjunct computer at the telephone central office. This reduces the memory storage requirements of the individual host computers. That is, the concern is that the hosts have limited capacity, rather than that the adjunct computer has limited capacity. Business is transacted using the adjunct computer. The information is then transmitted on-line to the appropriate host computers in order to create and activate orders at the hosts. The hosts update their inventory information and download the updated information to the adjunct computer for storage.

While the prior art approaches of storing and accessing the high volume of information needed for a transactional call-handling facility have worked well for their intended purposes, what is needed is a system and method that provide a cost-efficient means for operating a call-handling facility having automated interrogation functionality.

SUMMARY OF THE INVENTION

A system and a method for automated call handling of business interactions include providing local memory having stored records, specific to parties and having pre-programmed messages relating to the business interaction. A remote memory is used to store master records that are accessible by the local memory. In the preferred embodiment, the records stored in the local memory are subsets of the master records. The pre-programmed messages are directed to call parties using an automated interrogation device, which is preferably an interactive voice response (IVR) unit. The local memory provides a reduced capacity storage for the records, typically in a database format. The creation process and the file transfer process from the remote memory are independent from and asynchronous to IVR operation.

The subset records contain sufficient information to allow a calling party to complete an identification procedure and to at least initiate an intended business operation. For example, in a banking environment, the locally stored information may include customer names, account identifications, account balances, dates, and/or other information that is needed to verify identities and that is commonly requested by bank customers. In response to an incoming call, the IVR unit queries the calling party to determine the party's identity. The locally stored record of the party is accessed and may be retrieved to a temporary storage, such as in random access memory (RAM). Thus, the same information is contained in the remotely stored master record, the locally stored subset record, and the temporary storage. The information in the temporary storage is accessible to the automatic interrogation application in the same manner as the pre-programmed static messages. However, the variety and type of messages are increased.

Preferably, the subset records have a format of either one or two database tables. The first table is indexed by the customer identification. The optional second table is indexed according to the business of interest.

The database information in the subset records is readily accessible without an on-line connection to the remote storage of the master records. However, a data exchange is frequently implemented in order to synchronize the two sets of records (i.e., match record information). For example, a synchronization application may detect the times in which there are no ongoing calls within the system. The synchronization process may be implemented with any new callers receiving a message that presents options of calling back in a short time or being placed in a queue. A data connection is formed between the system and the remote storage site. Any updates of information are performed at this time. In an alternative embodiment, the synchronization can occur during ongoing calls, but without consequence on the ongoing calls. For example, there may be two separate instances of storing the subset records, so that the synchronization does not impact any ongoing updates of a subset record of a calling party.

The method of manipulating the data for a call-handling facility includes storing the master records at the site that is remote from the facility and generating subset records from the master records for storage at the facility. Each of the subset records is associated with one user of the call-handling facility and contains a portion of the information contained in the corresponding master record. The automated interrogation device (e.g., an IVR unit) is responsive to connection of a call and directs messages at the calling party. The messages are related to performing a business interaction with the calling party. The calling party is identified and the appropriate subset record is retrieved for temporary storage (e.g., in RAM). In a "retrieve information" application, such as in a banking environment, the IVR may prompt the calling party for an identification and password, then open the local database, retrieve the subset record, verify the identification, read the result, close the subset record, and verbalize results to the caller. In an "enter data" application, such as in a sales environment, the IVR may prompt the caller for an identification and password and data, then open the local database, retrieve the appropriate subset record, verify the identification, alter the subset record according to the obtained data, close the subset record, and signal completion. Periodically, the local storage of subset records is synchronized with the remote storage of master records.

DETAILED DESCRIPTION

Figure 1:
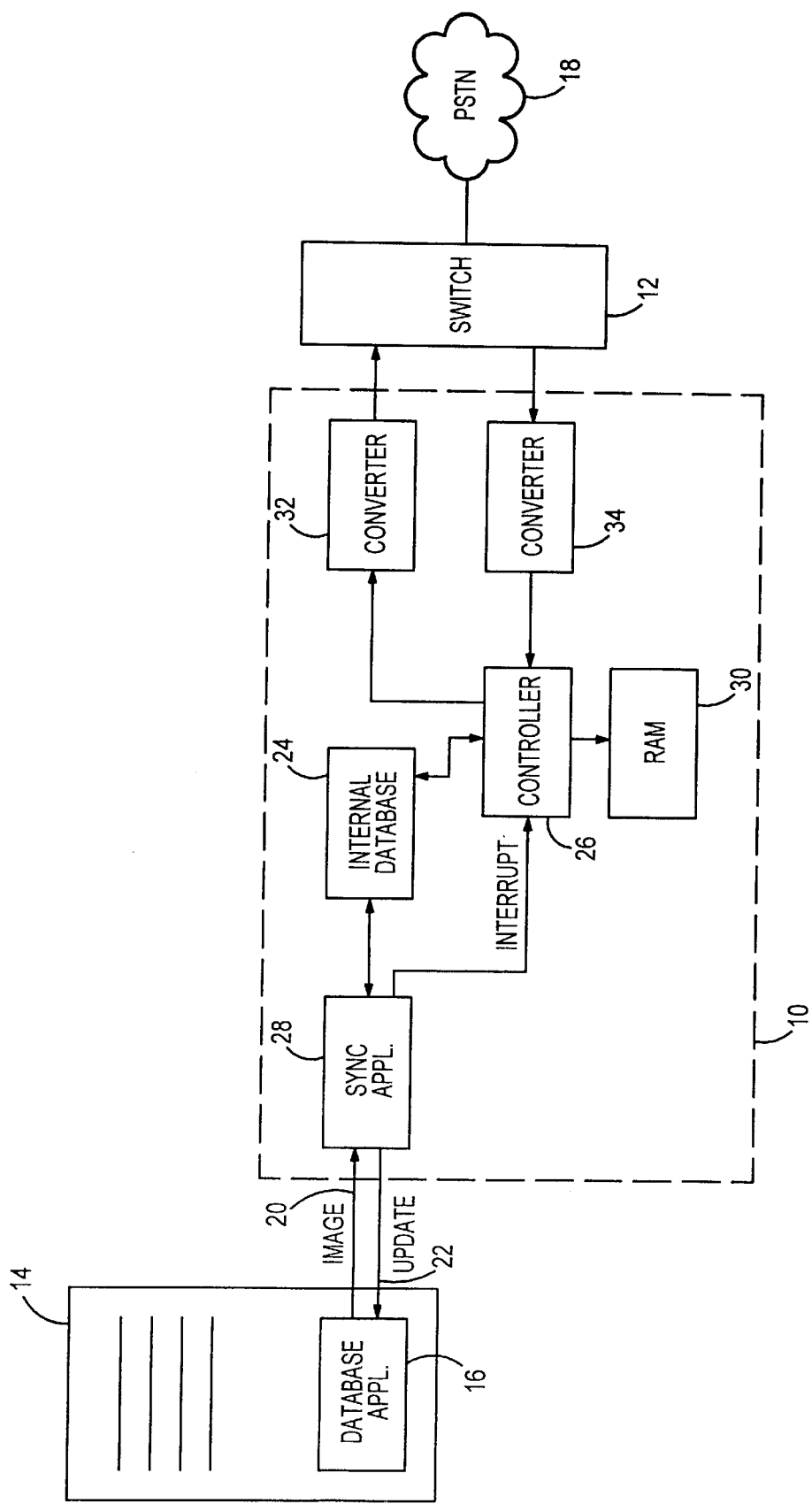
FIG. 1 is a schematic layout of components of one embodiment of a system for automated call handling in accordance with the invention.

With reference to FIG. 1, a system for providing automated call-handling capability includes an automated interrogation device 10, a switching fabric 12, and a remotely located host computer 14. As will be explained in detail below, the preferred embodiment is one in which the automated interrogation device includes an IVR application and a database application for storing records that are subsets of master records within a database application 16 of the host 14. The system of FIG. 1 allows retrieval and entry of information to and from database records in a manner similar to high-end IVRs, but without incurring the expense and overhead of a real-time link to the host 14.

The switching fabric 12 is located at the same facility as the automated interrogation device 10. The type of switching fabric is not critical to the invention. In one embodiment, the switching fabric is a private branch exchange (PBX). The switching fabric is shown as being connected to the public switched telephone network 18 (PSTN). Thus, remotely located telephones may access the automated interrogation device 10 via the PSTN 18 and the switching fabric 12.

The automated interrogation device 10 is shown as being connected to the host 14 by an input channel 20 and an output channel 22. The input channel transfers "images" of database records within the external database application 16 to the automated interrogation device. The images are the subset records that are maintained within an internal database 24 for access by the IVR application. In FIG. 1, the IVR application is represented by a controller 26. While the input and output channels 20 and 22 are represented as being isolated from the switching fabric 12, this is not critical to the invention. Alternatively, the data that is exchanged with the external database application may be directed through the PSTN 18.

The subset records in the internal database 24 are maintained in the same manner as the master records of the external database application 16. The maintenance is also consistent with full-scale databases for IVR systems that are not reliant upon external hosts (i.e., stand-alone IVR systems). However, because the internal database contains only images of the master records, there may be an increased need for a means of verifying and confirming to a calling party that a transaction has been completed. Preferably, the automated interrogation device 10 includes either or both of automatic facsimile capability or automatic e-mail capability. A verification or confirmation is particularly important if the subset records of the internal database 24 do not include inventory information in a sales application of the device. Without the inventory information, availability can be confirmed only after the call has been terminated and the inventory information within the remotely located host 14 has been accessed.

The subset records of the internal database 24 may be generated manually or automatically from the master records of the external database application 16. The subset records are transferred as files and then loaded onto the hard disk of the automated interrogation device 10 via a file transfer mechanism. This creation and file transfer process is independent and asynchronous of IVR operations. While not critical, the file transfer normally occurs while the IVR is free from calls with persons who require access to the subset records.

In contrast to conventional IVR systems, the automated interrogation device 10 does not directly modify data within the master records. The master records are opened, read or written, and then closed without interacting with a calling party. The automated interrogation device 10 interacts with callers and with the host 14, but not in a coordinated operation. It is the subset records within the internal database 24 that are utilized during the call. Preferably, the data within the subset records can be modified. The modifications are written to the master records during synchronization operations.

A synchronization application 28 coordinates the transfers of information between the automated interrogation device 10 and the host 14. The internal database 24 is updated and synchronized to the external database application 16 as needed. Preferably, the synchronization occurs only a limited number of times per day. The process may be triggered manually by an administrator or may be automatically triggered. The internal database 24 is updated while the IVR application of the controller 26 is in-service, but preferably while there are no active users (i.e., callers) of the automated interrogation device 10. While not critical, the synchronization application may disable the system with respect to receiving incoming calls. The controller 26 does not block incoming calls during the synchronization process. Rather, callers are given the option of being placed in a queue, being connected to an agent, or transferring to an internal extension. In another embodiment, there are two separate instances of the subset records in the internal database 24, so that incoming calls can continue to be processed without impact on the updating procedure.

In operation, the automated interrogation device 10 processes incoming calls during times that the device is not in communication with the host 14. A number of messages are directed to a call party. For example, a first message may be a greeting that includes a request for identification. Upon receiving an identification and any required verification (e.g., a password or PIN), the appropriate subset record from the internal database 24 is temporarily stored in memory of the controller 26. For example, the controller may access the subset record from the internal database 24 and store the record in random access memory 30 (RAM). The combination of the IVR configuration and the subset record determines the sequence of messages to be directed to the call party.

The automated interrogation device 10 includes two converters 32 and 34. The first converter 32 is used to place the outgoing messages in the proper format. As previously noted, the device is preferably used in an IVR environment, so the converter 32 audibilizes the outgoing messages for transmission via telecommunication lines.

The second converter 34 recognizes responses from call parties and properly formats the responses. For example, the responses may be DTMF tones that are generated by the call party by depressing designated telephone keys. The converter distinguishes the various DTMF signals. Alternatively, the responses from the call party may be voice messages. In this embodiment, the converter 34 is programmed with a sufficiently large vocabulary to identify the call response. The operations converters 32 and 34 are well known in the art.

Figure 2:
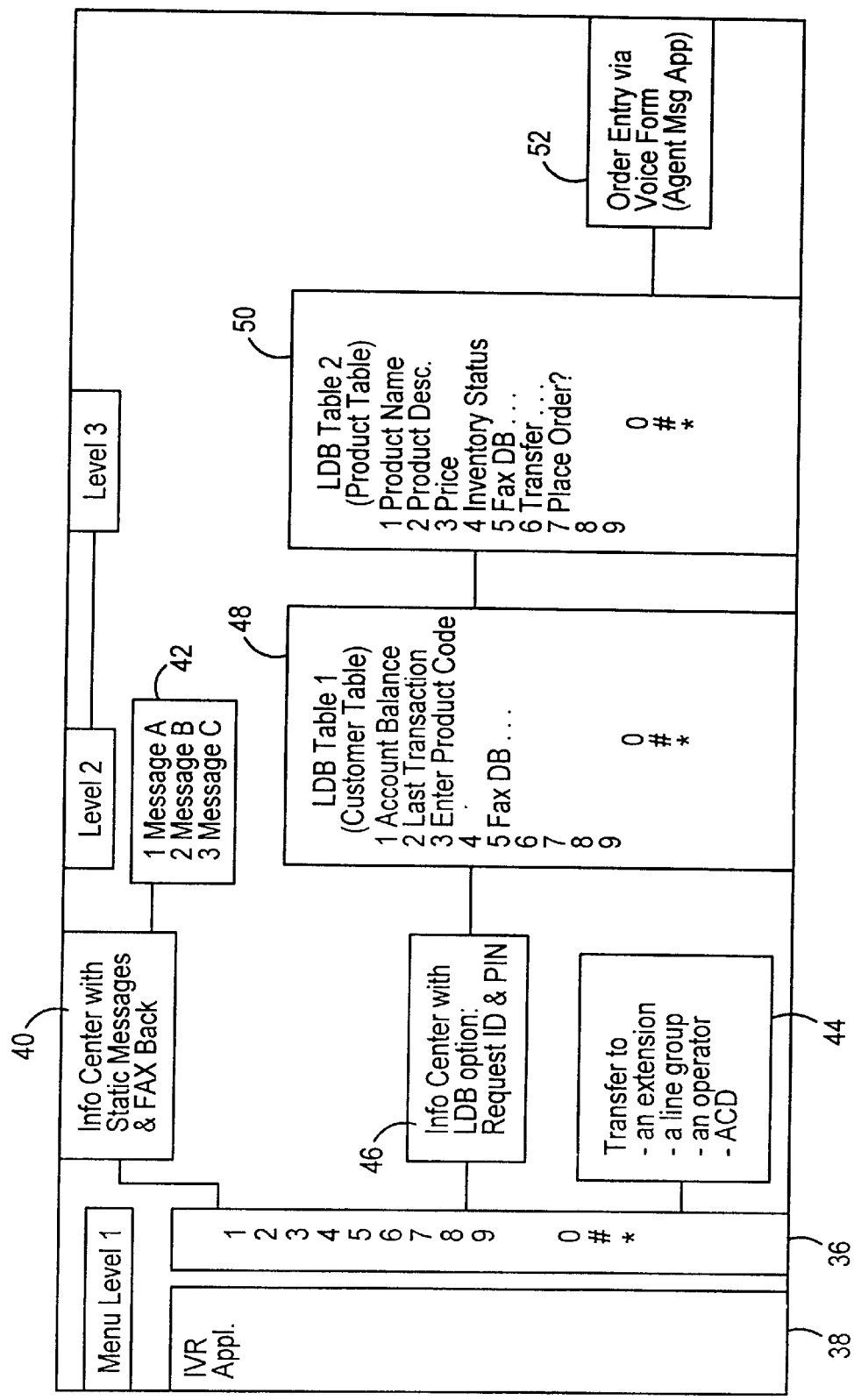
FIG. 2 is a block diagram of one embodiment of a flow of IVR dialog for utilizing the system of FIG. 1.

FIG. 2 is an example of the flow of an IVR dialog between the automated interrogation device 10 of FIG. 1 and a call party. In this example, DTMF signals are used to provide the responses to the system, as indicated by the twelve telephone key designations 36. The main IVR application 38 may present a standard greeting that provides three options to the call party. Depending upon the key that is depressed by the call party, the process moves to one of the three options. At the first option 40, the caller is presented with static messages 42 and, optionally, an automatically generated facsimile transmission. The content of the facsimile transmission will vary with the business environment in which the IVR is utilized. At a second option 44, the call party may transfer to an internal extension, a line group, an operator, or an automatic call distribution (ACD) agent.

The use of the subset records in the internal database 24 of FIG. 1 is triggered by selection of a third option 46 in a call flow of FIG. 2. A typical user prompt presented by the main IVR application 38 is, "Would you like specific information about your account?". The IVR application 38 then prompts the call party for an identification and a PIN. The response by the call party is stored and the appropriate subset record is retrieved. If the PIN is valid, the call party is prompted with the menu of the local database (LDB). The call party is also offered information from the local database in either spoken or facsimile format. If the PIN is invalid, the caller is again prompted for the number. The calling party is allocated three retries in identifying the appropriate PIN. It should be noted that the entire subset record is retrieved for the call party, with all fields, so that multiple database retrievals are not necessary. In FIG. 1, the subset record is stored in RAM 30. In FIG. 2, the LDB menu is shown as the customer table 48 of the second menu level.

Typically, only one LDB table 48 is required. However, some applications may require two tables, one that is indexed by the customer ID, and a second one 50 that is indexed by another variable, such as "Product Code," "Travel Destination" or "Doctor Name." The internal database 24 is structured to support two database tables. In some applications, it is desirable to enable acceptance of an order from a call party. One possibility is to provide a "Voice Form" 52. The use of such forms is known in the art.

Figure 3:
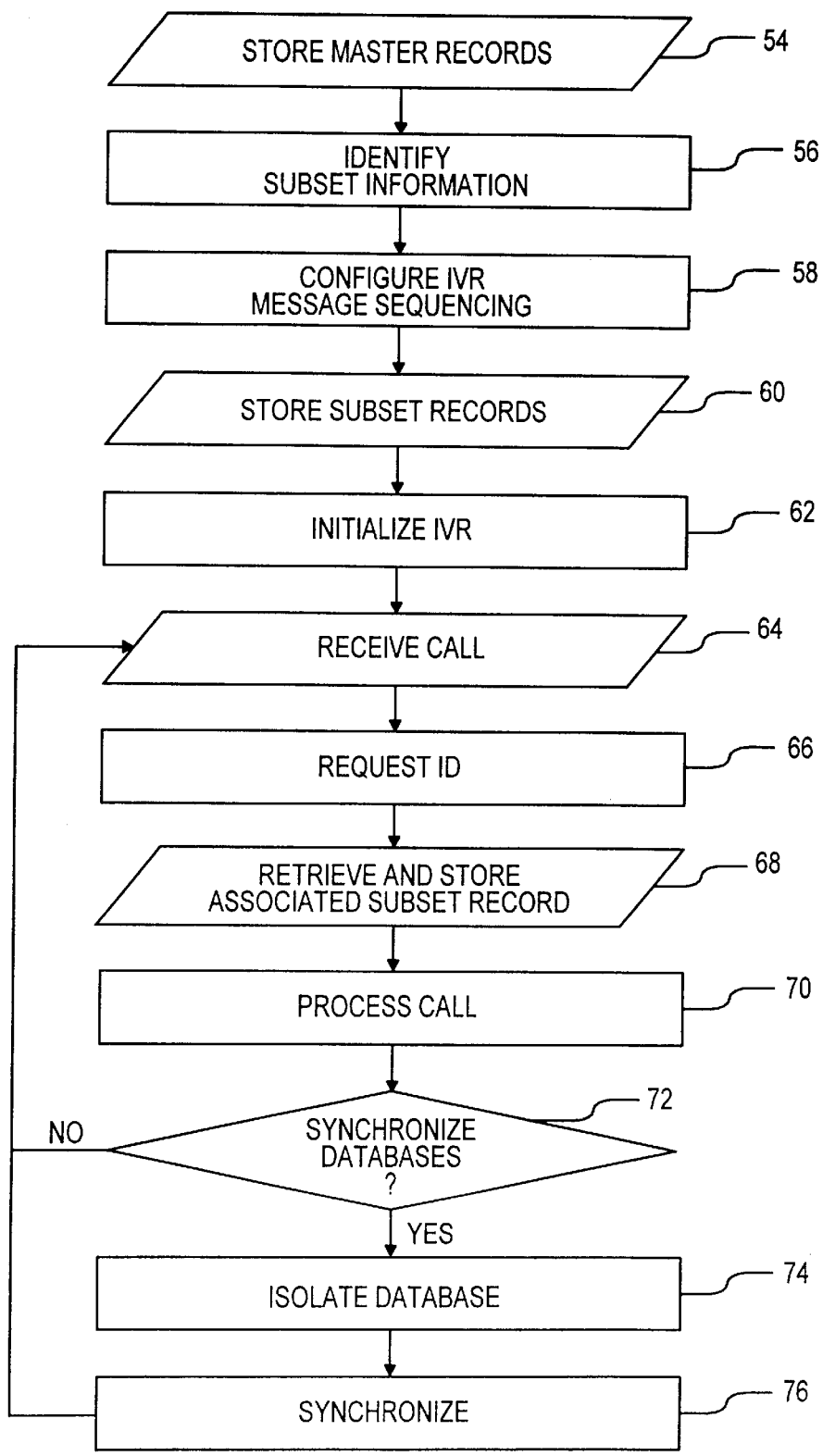
FIG. 3 is a process flow of steps for manipulating data for the system of FIG. 1.

A process flow of steps for utilizing the system of FIG. 1 is shown in FIG. 3. In a first step 54, the master records are stored at the host 14. This is a conventional step in IVR applications. The data that is included in the master records is dependent upon the business to be conducted or the service to be extended by the system.

In step 56, identification is made as to the information that is to be included in the subset records. This step may be performed by a system administrator. Typically, the "image" of the external master records is a small percentage of the total data in the remotely located database application 16. For example, a subset record may include a customer name, an account identification, an account balance, relevant dates, and other information that is repetitively required in the specific IVR application.

Step 58 of configuring the IVR message sequencing is closely tied with the step 56 of identifying the subset information. In one implementation, a system administrator may create an IVR dialog via a number of graphical user interface (GUI) screens. The first GUI screen for designing the call flow of FIG. 2 may be an "Info Center" screen that supports six selections for a menu key. The six selections are "Message," "FAX," "Both," "Menu," "LDB Data Table 1," and "LDB Data Table 2." Each of the final two selections has one parameter, i.e., "Info Center Data Name."

In a second GUI screen, the fields within the record retrieved from "LDB Data Table 1" are configured. The configuration is not critical to the present invention. The configuration includes identifying operations, such as retrieve, enter, verify, ignore and search. Data that is retrieved from the local database is generally spoken to the incoming caller, exactly as static messages are audibilized. An enter data operation enters data into the local database in response to caller inputs, such as DTMF signals or discrete speech that is recognized by the second converter 34 of FIG. 1. In a verify data operation, more than just the caller's PIN may be required. There may be a second step to verification, such as a question directed to the caller, e.g., "Is your ZIP Code XXXX?". As another alternative, the verification may be biometric information, such as the incoming caller's speech pattern. A search operation is one in which data is selectively presented to the caller. For instance, if the subset record that is retrieved from the local database 24 includes 100 fields, there may be a limited number of designated fields which are selectively spoken to the call party. However, it should be noted that this designation does not result in more than one retrieval from the local database 24. An entire subset record including all fields is retrieved and stored in the temporary memory, such as RAM 30. From the standpoint of the IVR operation, the data that is temporarily stored is essentially the same as the data stored as static messages 42 in FIG. 2. The variety and type of messages increases, but the treatment of messages remains the same.

The next GUI screen is required only if a second LDB table 50 is included. The process for configuring the information relating to the second table is substantially the same as the process for the first table. Then, a final screen is utilized to configure synchronization of the local database 24 to the remotely located database application 16. Synchronization will be described more fully below.

in step 60, the subset records are stored at the internal database 24 of FIG. 1. The records are stored as one or two tables, but preferably not more. For example, in an inventory environment, the database might have two tables, with one being used to identify the call party and the second being used to list all products and availability dates. From the viewpoint of the IVR application, retrieve operations are executed as single searches into the internal database 24 for a single record. Complex searches are not executed. To the incoming caller, a cause-and-effect relationship appears to exist between the two tables as the process progresses as if there are multiple menu selections, but at the database level no such relationship exists.

The database tables are composed of simple, "flat" records, much like conventional records in a desktop computer database. The number of fields per record is preferably limited to fifty, but this is not critical. The number of subset records is limited by available physical memory, performance goals for retrieving subset records, and performance goals with respect to the synchronization operation.

In step 62, the IVR is initialized and available for calls. The automated interrogation device 10 of FIG. 1 may be used to process either or both of incoming and outgoing calls. Upon receiving a first call at step 64, the automated processing is implemented. For instance, the device may prompt the call party for an identification and a PIN at step 66. Upon receiving a response, a particular subset record is retrieved at step 68. The entire record is retrieved, with all fields, so that multiple retrieve operations are not necessary.

The call is then processed at step 70 according to the operations performed in steps 56, 58 and 60. In some embodiments, the process is used to provide information to the call party. For example, in a banking environment, account information may be conveyed to the call party. In a sales environment, an order may be processed. If there are inventory concerns, the subset record may be modified, but the master record will not be modified until a subsequent synchronization operation is implemented. However, in some embodiments, simultaneous modification of the internal and external databases may be invoked. Nevertheless, typically the call party can enter data into the automated interrogation device 10, but the transaction will not be guaranteed to be recorded at the remotely located database application 16 within a set time period, or even guaranteed to be accurately entered into the remotely located database application. Without a full awareness of the product availability, guarantees cannot be extended. Thus, the system is best suited for applications in which availability concerns are not dominant, such as providing bank account balances which are not likely to change often in a single day.

In step 72, a determination is made as to whether it is appropriate to synchronize the subset records of the internal database 24 with master records of the remotely located database application 16. As previously noted, the synchronization operation typically is executed when there are no ongoing calls with customers. Thus, a positive response to the determination step 72 results in a step 74 of isolating the database from incoming calls. Any incoming calls that are received during the synchronization process may be given the options of transferring to an extension, transferring to a queue, or transferring to a voicemail system. The goal is to avoid mutual exclusion problems, rather than to try to solve such problems.

In step 76, the synchronization process is executed. The internal database 24 is updated and synchronized with the remotely located database application 16, using channels 20 and 22 of a communications link. The type of communications link is not critical to the invention. The subset records are received from the remotely located database application 16 as files. The synchronization application 28 checks the files for consistency, integrity and completeness. Optionally, this can be performed at the host 14.

The verified subset records are loaded to the internal database 24. The process may be a bulk import of records or there may be an individual replacement of records (i.e., read, modify and write records). The process may occur automatically, or may require manual intervention. If the synchronization fails, the subset records are restored to their original state within the internal database 24, when possible. For instances in which a portion of the new records have been verified, the verified records can replace the existing records.

When the synchronization process at step 76 is completed, the system is returned to a state for receiving incoming calls, as indicated by the return arrow to step 64.

What is claimed is:

1. A system for automated handling of call interactions with a plurality of call parties comprising:
    an automated interrogation device responsive to connection of calls involving said call parties to direct a sequence of interrogation messages to each said call party, said interrogation messages being related to a business interaction with said call party and at least some of said interrogation messages being specific to acquiring interaction-related information to be stored, said automated interrogation device being enabled to recognize responses to said interrogation messages by said call party;
    local memory having stored subset records relating to said plurality of call parties, each of said subset records being dedicated to a particular said call party, said subset records being locally accessible to said automated interrogation device during said calls in which said automated interrogation device is accessed, said local memory being local to said automated interrogation device and being operationally associated with said automated interrogation device to alter said subset records in response to receiving said interaction-related information to be stored; and
    remote memory having stored master records relating to said call parties, each of said master records being dedicated to one of said call parties and having a correspondence to said subset record dedicated to a same said call party, said subset records being subsets of information within said master records, each said subset record being specifically configured to maintain only selected data relating to said call party to which said subset record is dedicated, such that corresponding said subset and master records are distinguishable with respect to capacities of information relevant to said same call party to which said subset and master records are dedicated, said remote memory being remotely located from said automated interrogation device and said local memory, said remote memory being remotely accessible via a communications line for recurringly synchronizing said interaction-related information within said subset records stored at said local memory with information within said master records, said local and remote memories being configured such that, during said synchronizing step, said subset and master records are isolated from said calls involving said call parties.

2. The system of claim 1 wherein each of said local and remote memories includes a database application for organizing said subset records and master records.

3. The system of claim 2 wherein each said subset record of said local memory includes a user profile that is specific to said particular call party to which said each subset record is dedicated.

4. The system of claim 1 wherein said automated interrogation device includes an interactive voice response (IVR) unit for transmitting said interrogation messages as voice messages.

5. The system of claim 4 wherein said IVR unit is directly supported by said local memory during said calls involving said automated interrogation device, said local memory being a recording medium, said matching of information being executed transparently with respect to said local memory support of said IVR unit, said local and remote memories being systematically connected via a periodic temporary data link to enable periodic said matching of information.

6. The system of claim 1 wherein said remote memory includes a storage device that is remotely located from said automated interrogation device and said local memory, said master records and said subset records of said local memory being stored in database formats, said automated interrogation device including an IVR unit.

7. The system of claim 6 wherein said subset records of said local memory are tables that are configured based upon selected information from said master records, each said subset record thereby being a subset of information of one of said master records.

8. The system of claim 7 wherein interrogation messages of said automated interrogation device are specific to a business interaction relating to one of account balances and inventory.

9. A system for manipulating data for a call-handling facility comprising:
communications means local to said facility for handling incoming and outgoing calls;
an interactive voice response (IVR) means local to said facility and operatively associated with said communication means for generating voice messages during calls and for responding to caller responses to said voice messages;
a local storage device having a plurality of low volume records specific to users of said IVR means, said local storage device being local to said facility and said IVR means, said local storage device being accessible by said IVR means in real time during ongoing calls such that retrieval of said low volume records is enabled, each said low volume record having a database format, each said low volume record being associated with a particular said user for which said voice messages are generated and containing database information commonly accessed in calls involving said particular user and said IVR means;
a remote storage device having a plurality of high volume records specific to said users of said IVR means, said remote storage device being remotely located from said facility, said remote storage device being isolated from said IVR means with respect to accessing said high volume records as direct responses to said ongoing calls, each said high volume record having a database format, each said high volume record being associated with a particular said user and with said low volume record associated with said particular user, said low volume records having subsets of information of said associated high volume records, wherein said local storage device has a lower storage capacity as compared to said remote storage device; and
means for triggering a data exchange between said local and remote storage devices such that data fields that are common to said high and low volume records are synchronized, wherein said triggering means is configured to limit said data exchange to occasions in which there are no ongoing calls.

10. The system of claim 9 wherein said local storage device is internal memory of said IVR means.

11. The system of claim 9 wherein each said low volume record includes user profile information regarding one of said users.

12. A method of manipulating data for a call-handling facility comprising steps of:
storing master records at a common site remote from said facility, said master records containing information relating to users of said facility;
storing subset records at said facility for subsequent access as responses to calls between said facility and said users, each said subset record being associated with one of said users and containing a portion of said information contained in said master record associated with said same user, including basing determinations of whether to include said information in said subset records upon pre-identification of which said portion of said information contained in said master records is to be contained in said subset records;
initializing an automated interrogation device that is located at said facility and that is responsive to connection of a call such that messages generated by said automated interrogation device are directed to a call party as one of said users, said messages being related to a business interaction with said call party and to identifying said call party as being a specific one of said users, whereby an association between said call party and a particular subset record is recognized as a direct consequence of said identifying said call party as being said user, said automated interrogation device accessing said particular subset record upon recognizing said association;
selectively updating said information contained in said subset records that are accessed by said automated interrogation device upon recognizing said associations, including using said messages to solicit updating information that is used in said updating; and
on a noncontinuous basis, exchanging record information between said subset and master records by establishing a temporary data link between said remote site and said facility, including synchronizing said updated information between said subset records and said master records, said subset records thereby being accessed during said calls involving said users while said master records are accessed in isolation from and without consequence to said calls.

13. The method of claim 12 wherein said step of exchanging record information is executed such that accessing said master records occurs without consequence on an information exchange between said automated interrogation device and one of said users.

14. The method of claim 12 wherein said automated interrogation device is an interactive voice response unit having internal memory, said step of storing said subset records including uploading said portions of said information from said remote site to said internal memory.

15. The method of claim 14 wherein said step of storing said subset records includes forming a table containing user profile information, including basing said user profile information on said information in said master records relating to said users.

16. The method of claim 12 wherein said step of exchanging record information includes comparing said information contained in said master records with said portion of information contained in said subset records to adjust for inconsistencies.

17. The method of claim 12 wherein said steps of storing said master and subset records includes configuring databases, said step of storing said subset records further including uploading selected information from said remote site.

18. The method of claim 17 wherein said messages are directed to said call party as prompts, said step of initializing including selecting a menu tree of prompts.

19. The method of claim 12 wherein said step of exchanging record information includes disabling said automated interrogation device with respect to receiving incoming calls, so as to accommodate said exchanging.

* * * * *